(12) United States Patent
Short et al.

(10) Patent No.: US 9,550,343 B2
(45) Date of Patent: Jan. 24, 2017

(54) LAMINATED TRANSPARENCY WITH CONTROLLED FAILURE AND METHOD OF MAKING THE SAME

(75) Inventors: John R. Short, Madison, AL (US); Carlo A. Scarinci, North Hollywood, CA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 1265 days.

(21) Appl. No.: 13/225,942

(22) Filed: Sep. 6, 2011

(65) Prior Publication Data
US 2012/0064305 A1 Mar. 15, 2012

Related U.S. Application Data

(60) Provisional application No. 61/381,212, filed on Sep. 9, 2010.

(51) Int. Cl.
| | | |
|---|---|---|
| *E06B 5/00* | (2006.01) | |
| *E06B 5/10* | (2006.01) | |
| *E06B 5/12* | (2006.01) | |
| *B32B 17/10* | (2006.01) | |

(52) U.S. Cl.
CPC ... *B32B 17/10036* (2013.01); *B32B 17/10688* (2013.01); *B32B 17/10761* (2013.01); *B32B 17/10935* (2013.01); *B32B 17/10981* (2013.01); *E06B 5/10* (2013.01); *E06B 5/12* (2013.01); *Y10T 428/2476* (2015.01); *Y10T 428/24752* (2015.01)

(58) Field of Classification Search
CPC ............ E06B 5/00; E06B 5/10; E06B 5/12
USPC .................. 52/204.6, 204.62, 204.593
See application file for complete search history.

(56) References Cited

U.S. PATENT DOCUMENTS

| | | | | |
|---|---|---|---|---|
| 2,322,582 A | * | 6/1943 | Marini | 52/208 |
| 5,523,138 A | * | 6/1996 | Chinzi | 428/43 |
| 2004/0023039 A1 | | 2/2004 | Schwamb et al. | |
| 2008/0231028 A1 | * | 9/2008 | Brandsch et al. | 280/753 |

FOREIGN PATENT DOCUMENTS

| | | |
|---|---|---|
| DE | 101 19 315 C1 | 7/2002 |
| WO | 03018311 A1 | 3/2003 |
| WO | 2008010002 A1 | 1/2008 |

OTHER PUBLICATIONS

PCT Search Report, PCT/US2011/050789, dated Dec. 5, 2011.

* cited by examiner

*Primary Examiner* — Jenna Johnson
(74) *Attorney, Agent, or Firm* — Lester N. Fortney

(57) ABSTRACT

A laminated transparency includes a first ply having a No. 1 surface and a No. 2 surface. A second ply is spaced from the first ply and has a No. 3 surface and a No. 4 surface, with the No. 2 surface facing the No. 3 surface. A polymeric interlayer is positioned between the first and second plies. At least one failure strip is incorporated into the interlayer to provide a predetermined failure orientation for the transparency.

7 Claims, 5 Drawing Sheets

LAMINATED TRANSPARENCY WITH CONTROLLED FAILURE AND METHOD OF MAKING THE SAME

CROSS-REFERENCE TO RELATED APPLICATION

This application claims priority to U.S. Provisional Application Ser. No. 61/381,212, filed on Sep. 9, 2010, which is herein incorporated by reference in its entirety.

BACKGROUND OF THE INVENTION

Field of the Invention

This invention relates generally to window structures for buildings, vehicles or other applications and, more particularly, to a window capable of controlled failure from blast pressures due to explosions, bomb blasts, car bombs, and the like.

Technical Considerations

Terrorist attacks utilizing explosives, such as grenades, bombs, or similar devices, are increasing in an ever more dangerous world. One of the weakest points on a structure, such as a building or vehicle, is the window or similar transparent glass area. In the event of an explosion outside of the building, people in the building can become injured as the result of shattered and flying glass fragments entering the building. A conventional response to this threat is to make the window stronger and more resistant to blast damage. This can take the form of using glass panes of increased thickness, using laminated glass structures, applying safety films or sheets to the glass, or incorporating perforated metal sheets into the window structure to help prevent blast damage. However, as a general rule, the more components added to the window to increase the window strength, the lower the visible light transmittance of the window and the harder it is to see through the window. Also, conventional precautions, such as perforated metal sheets or other metallic structures, can be easily seen. This would alert a potential attacker that the window is a blast-resistant window.

In some applications, it would be advantageous to provide a window with a controlled failure orientation such that, in the event of an explosive blast exterior to the building, the window would break in a pre-selected orientation and/or remain connected to the window frame to reduce damage or injury to the building occupants. It would also be advantageous if such a failure oriented window were not easily detectable by viewing with the naked eye so that potential attackers would not know that the window is a safety window.

SUMMARY OF THE INVENTION

A laminated transparency comprises a first ply having a No. 1 surface and a No. 2 surface. A second ply is spaced from the first ply and has a No. 3 surface and a No. 4 surface, with the No. 2 surface facing the No. 3 surface. A polymeric interlayer is positioned between the first and second plies. At least one failure strip is incorporated into the interlayer to provide a predetermined failure orientation for the transparency.

Another laminated transparency comprises a first glass ply having a No. 1 surface and a No. 2 surface. A second glass ply is spaced from the first glass ply and has a No. 3 surface and a No. 4 surface, with the No. 2 surface facing the No. 3 surface. A polyvinylbutyral interlayer is positioned between the first and second plies. At least one failure strip comprising polypropylene or polyethylene is incorporated into the interlayer to provide a predetermined failure orientation for the transparency.

A method of making a laminated transparency comprises obtaining an interlayer divided into a plurality of interlayer segments; forming a layer of a failure strip material onto a base sheet of the same material as the interlayer to form a coated base sheet; dividing the coated base sheet into strips of a selected geometry; positioning at least one strip of the coated base sheet between adjacent interlayer segments; positioning the interlayer with the strips of base sheet material between two glass plies; and heating the glass plies and interlayer to incorporate the failure strip into the interlayer and adhere the glass plies together.

A method of making a laminated transparency comprises obtaining an interlayer divided into a plurality of interlayer segments; applying at least one strip of a polymeric tape along at least a portion of the edge of at least one of the interlayer segments; positioning the interlayer segments with the tape strips between two glass plies; and heating the glass plies and interlayer segments to incorporate the polymeric tape strip into the interlayer and adhere the glass plies together.

BRIEF DESCRIPTION OF THE DRAWINGS

The invention will be described with reference to the following drawing figures where like reference numbers identify like parts throughout.

DESCRIPTION OF THE PREFERRED EMBODIMENTS

Figure 1:
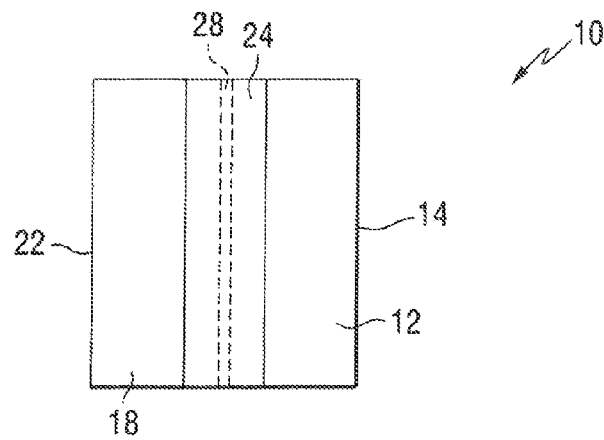
FIG. 1 is a side view (not to scale) of a laminated window incorporating features of the invention.

As used herein, spatial or directional terms, such as "left", "right", "inner", "outer", "above", "below", and the like, relate to the invention as it is shown in the drawing figures. However, it is to be understood that the invention can assume various alternative orientations and, accordingly, such terms are not to be considered as limiting. Further, as used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 3.3, 4.7 to 7.5, 5.5 to 10, and the like. Further, as used herein, the terms "formed over", "deposited over", or "provided over" mean formed, deposited, or provided on but not necessarily in direct contact with the surface. For example, a coating layer "formed over" a substrate does not preclude the presence of one or more other coating layers or films of the same or different composition located between the formed coating layer and the substrate. Additionally, all documents, such as but not limited to issued patents and patent applications, referred to herein are to be considered to be "incorporated by reference" in their entirety. As used herein, the terms "polymer" or "polymeric" include oligomers, homopolymers, copolymers, and terpolymers, e.g., polymers formed from two or more types of monomers or polymers. The terms "visible region" or "visible light" refer to electromagnetic radiation having a wavelength in the range of 380 nm to 760 nm. The terms "infrared region" or "infrared radiation" refer to electromagnetic radiation having a wavelength in the range of greater than 760 nm to 100,000 nm. The terms "ultraviolet region" or "ultraviolet radiation" mean electromagnetic energy having a wavelength in the range of 300 nm to less than 380 nm.

A transparency of the invention can have any desired visible light, infrared radiation, or ultraviolet radiation transmission and reflection. For example, the transparency can have a visible light transmission of any desired amount, e.g., greater than 0% to 100%. In one non-limiting embodiment, the visible light transmission at a reference wavelength of 550 nm can be greater than 20%, such as greater than 30%, such as greater than 40%, such as greater than 50%, such as greater than 60%, such as greater than 70%, such as greater than 80%.

Figure 2:
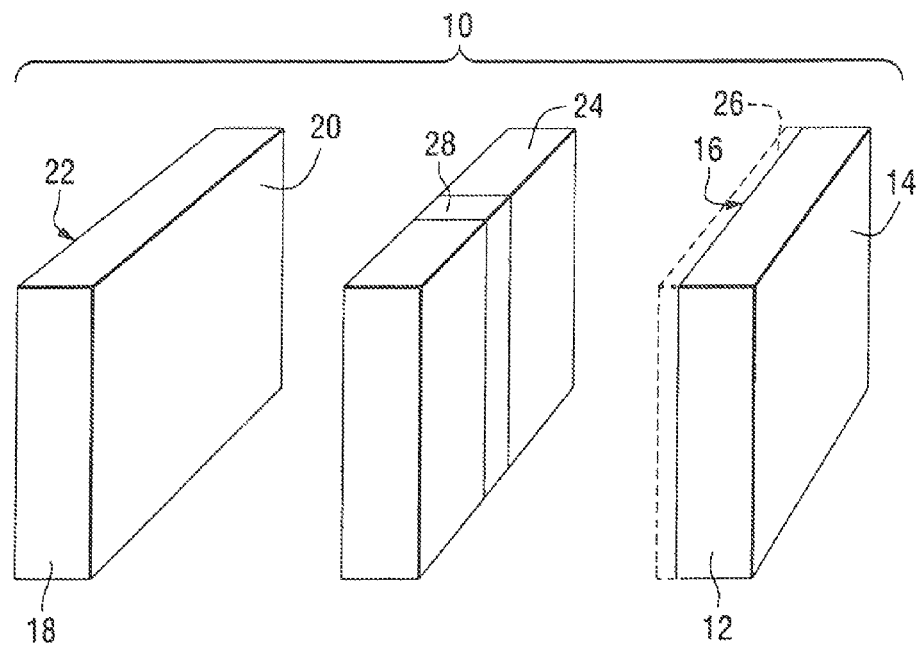
FIG. 2 is an expanded view (not to scale) of the window of FIG. 1.

An exemplary transparency 10 of the invention in the form of a laminated building window is shown in FIGS. 1 and 2. The transparency 10 includes a first ply 12 with a first major surface 14 facing the building exterior, i.e., an outer major surface (No. 1 surface), and an opposed second or inner major surface 16 (No. 2 surface). The transparency 10 also includes a second ply 18 having an outer (first) major surface 20 (No. 3 surface), and an inner (second) major surface 22 (No. 4 surface). This numbering of the ply surfaces is in keeping with conventional practice in the fenestration art. The first and second plies 12, 18 are bonded together by a polymeric interlayer 24. A solar control coating 26 can be formed over at least a portion of one of the plies 12, 18, such as but not limited to over the No. 2 surface 16 or No. 3 surface 20. In the practice of the invention and as described in more detail below, at least one failure strip 28 is incorporated into the interlayer 24 of the transparency 10.

In the broad practice of the invention, the plies 12, 18 of the transparency 10 can be of the same or different materials. The plies 12, 18 can include any desired material having any desired characteristics. For example, one or both of the plies 12, 18 can be transparent or translucent to visible light. By "transparent" is meant having visible light transmission of greater than 0% to 100%. Alternatively, one or both of the plies 12, 18 can be translucent. By "translucent" is meant allowing electromagnetic energy (e.g., visible light) to pass through but diffusing this energy such that objects on the side opposite the viewer are not clearly visible. Examples of suitable materials include, but are not limited to, plastic substrates (such as acrylic polymers, such as polyacrylates; polyalkylmethacrylates, such as polymethylmethacrylates, polyethylmethacrylates, polypropylmethacrylates, and the like; polyurethanes; polycarbonates; polyalkylterephthalates, such as polyethyleneterephthalate (PET), polypropyleneterephthalates, polybutyleneterephthalates, and the like; polysiloxane-containing polymers; or copolymers of any monomers for preparing these, or any mixtures thereof); ceramic substrates; glass substrates; or mixtures or combinations of any of the above. For example, one or both of the plies 12, 18 can include conventional soda-lime-silicate glass, borosilicate glass, or leaded glass. The glass can be clear glass. By "clear glass" is meant non-tinted or non-colored glass. Alternatively, the glass can be tinted or otherwise colored glass. The glass can be annealed or heat-treated glass. As used herein, the term "heat treated" means tempered or at least partially tempered. The glass can be of any type, such as conventional float glass, and can be of any composition having any optical properties, e.g., any value of visible transmission, ultraviolet transmission, infrared transmission, and/or total solar energy transmission. The first and second plies 12, 18 can each be, for example, clear float glass or can be tinted or colored glass or one ply 12, 18 can be clear glass and the other ply 12, 18 colored glass. The first and second plies 12, 18 can be of any desired dimensions, e.g., length, width, shape, or thickness. In one exemplary transparency, the first and second plies can each be 1 mm to 10 mm thick, such as 1 mm to 5 mm thick, such as 1.5 mm to 2.3 mm thick.

The interlayer 24 can be of any desired material and can include or be formed from one or more layers or plies. The interlayer 24 can be a polymeric or plastic material, such as, for example, polyvinylbutyral, plasticized polyvinyl chloride, or multi-layered thermoplastic materials including polyethyleneterephthalate, etc. The interlayer 24 secures the first and second plies 12, 18 together, provides energy absorption, reduces noise, and increases the strength of the laminated structure. The interlayer 24 can also be a sound-absorbing or attenuating material. The interlayer 24 can have a solar control coating provided thereon or incorporated therein or can include a colored material to reduce solar energy transmission. In one non-limiting embodiment, the interlayer 24 has a thickness in the range of 0.5 mm to 1.5 mm, such as 0.75 mm to 0.8 mm. In another non-limiting embodiment, the interlayer can have a thickness in the range of 20 thousands of an inch to 100 thousands of an inch, such as 25 thousands of an inch to 60 thousands of an inch.

The solar control coating 26 can be deposited over at least a portion of a major surface of one of the plies 12, 18, such as on the inner surface 16 of the outboard ply 12 (FIG. 1) or the outer surface 20 of the inner ply 18. As used herein, the term "solar control coating" refers to a coating comprised of one or more layers or films that affect the solar properties of the coated article, such as, but not limited to, the amount of solar radiation, for example, visible, infrared, or ultraviolet radiation, reflected from, absorbed by, or passing through the coated article; shading coefficient; emissivity, etc. The solar control coating can block, absorb, or filter selected portions of the solar spectrum, such as, but not limited to, the IR, UV, and/or visible spectrums.

In one non-limiting embodiment, the solar control coating 26 can include one or more metallic films positioned between pairs of dielectric layers applied sequentially over at least a portion of one of the plies 12, 18. The solar control coating 26 can be a heat and/or radiation reflecting coating and can have one or more coating layers or films of the same or different composition and/or functionality. As used herein, the term "film" refers to a coating region of a desired or selected coating composition. A "layer" can comprise one or more "films" and a "coating" or "coating stack" can comprise one or more "layers". For example, the solar control coating 26 can be a single layer coating or a multi-layer coating and can include one or more metals, non-metals, semi-metals, semiconductors, and/or alloys, compounds, compositions, combinations, or blends thereof. For example, the solar control coating 26 can be a single layer metal oxide coating, a multiple layer metal oxide coating, a non-metal oxide coating, a metallic nitride or oxynitride coating, a non-metallic nitride or oxynitride coating, or a multiple layer coating comprising one or more of any of the above materials. In one non-limiting embodiment, the solar control coating 26 can be a doped metal oxide coating.

Non-limiting examples of suitable coatings 26 for use with the invention are commercially available from PPG Industries, Inc. of Pittsburgh, Pa. under the SUNGATE® and SOLARBAN® families of coatings. Such coatings typically include one or more antireflective coating films comprising dielectric or anti-reflective materials, such as metal oxides or oxides of metal alloys, which are transparent to visible light. The coating 26 can also include one or more infrared reflective films comprising a reflective metal, e.g., a noble metal such as gold, copper or silver, or combinations or alloys thereof, and can further comprise a primer film or barrier film, such as titanium, as is known in the art, located over and/or under the metal reflective layer. The coating 26 can have any desired number of infrared reflective films, such as, but not limited to, 1 to 5 infrared reflective films. In one non-limiting embodiment, the coating 26 can have 1 or more silver layers, e.g., 2 or more silver layers, e.g., 3 or more silver layers, such as 5 or more silver layers.

The failure strip 28 can be a polymeric strip, such as a Mylar strip, a polyethyleneteraphthalate (PET) strip, a polypropylene strip, a polyethylene strip, or the like, or the failure strip 28 can comprise a polysiloxane material or a mold release agent. The failure strip 28 can be embedded in the interlayer 24. The failure strip need not be a single strip but can be formed by two or more segments. The failure strip 28 can extend all the way through the width of the interlayer 24 or the failure strip 28 can be embedded in the interlayer material, i.e., surrounded by the interlayer material.

Figure 3:
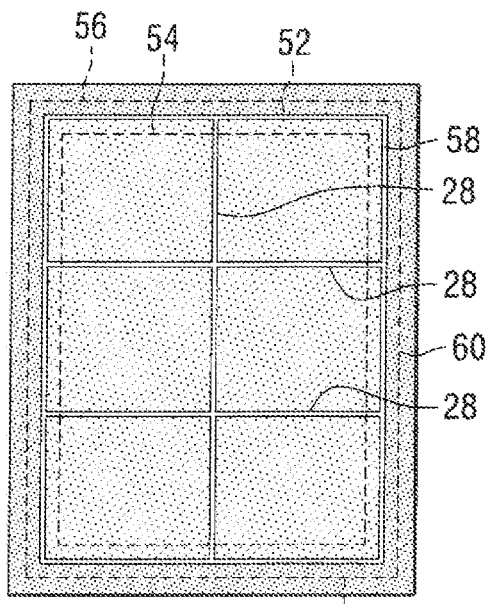
FIG. 3 is a front view (not to scale) of another window of the invention with failure strips in a first exemplary orientation and in a non-ruptured condition.
Figure 5:
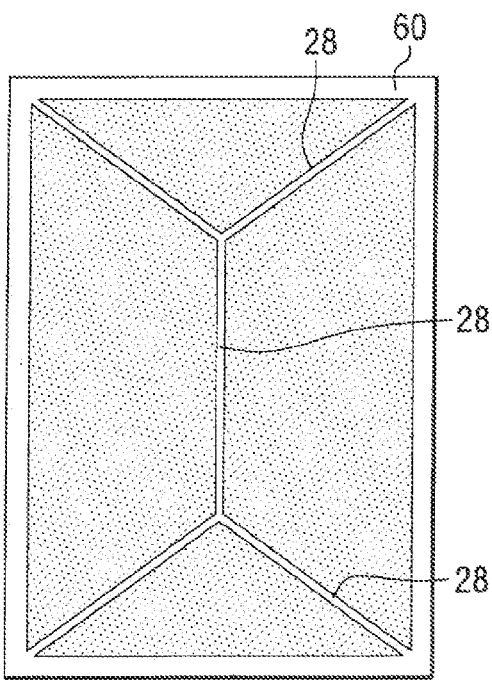
FIG. 5 is a front view (not to scale) of another window of the invention showing failure strips in a second exemplary orientation and in a non-ruptured condition.

The orientation of the failure strip 28 in FIGS. 1 and 2 is simply one exemplary embodiment. FIGS. 3 and 5 illustrate other non-limiting examples of the inclusion of one or more failure strips 28 into the interlayer 24 of the window in various orientations. The window is shown incorporated into a frame 60.

Figure 4:
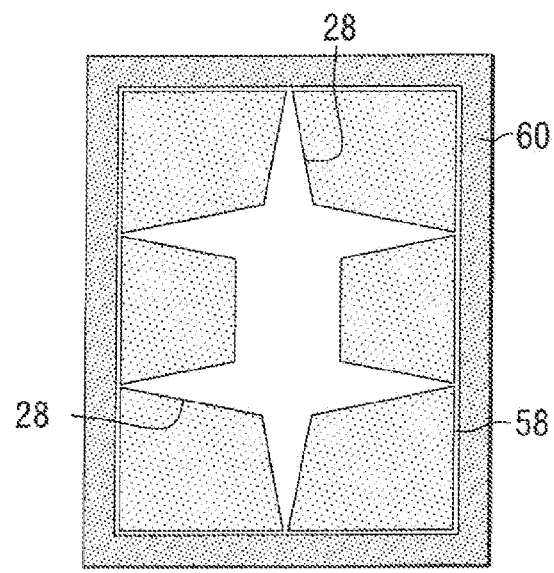
FIG. 4 is a front view (not to scale) of the window of FIG. 3 in a ruptured condition.
Figure 6:
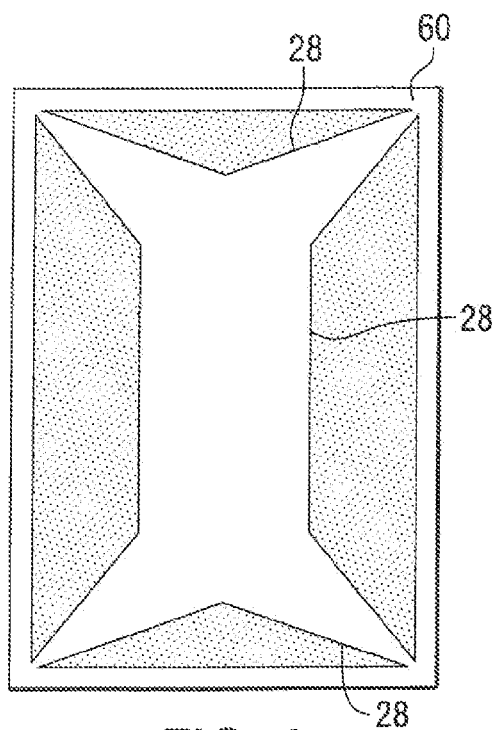
FIG. 6 is a front view (not to scale) of the window of FIG. 5 in a ruptured condition.

The inclusion of the failure strip(s) 28 provides that in the event of a blast sufficient to break the window, the window will break or fail in a controlled geometry defined by the failure strips 28. The failure strips 28 essentially incorporate a "defect" into the window structure and cause the interlayer 24 to fail along the defect in a predefined geometry. FIGS. 4 and 6 show the windows of FIGS. 3 and 5, respectively, in a failed or ruptured condition. Since the failure strips 28 are very thin, they cannot be readily discerned visually and, thus, a viewer will not easily realize that the window is a safety window. For example, the failure strip can have a thickness of less than 1 cm, such as less than 15 mm, such as less than 10 mm, such as less than 5 mm, such as less than 3 mm, such as less than 2 mm, such as less than 1 mm, such as less than 0.5 mm, such as less than 0.1 mm, such as less than 0.05 mm, such as less than 0.02 mm, such as less than 0.015 mm. For example, the failure strip can have a thickness in the range of 0.013 mm to 15 mm, such as 0.01 mm to 10 mm, such as 0.013 mm to 5 mm, such as 0.04 mm to 3 mm, such as 0.05 mm to 1 mm, for example 0.01 mm to 0.05 mm.

Figure 7:
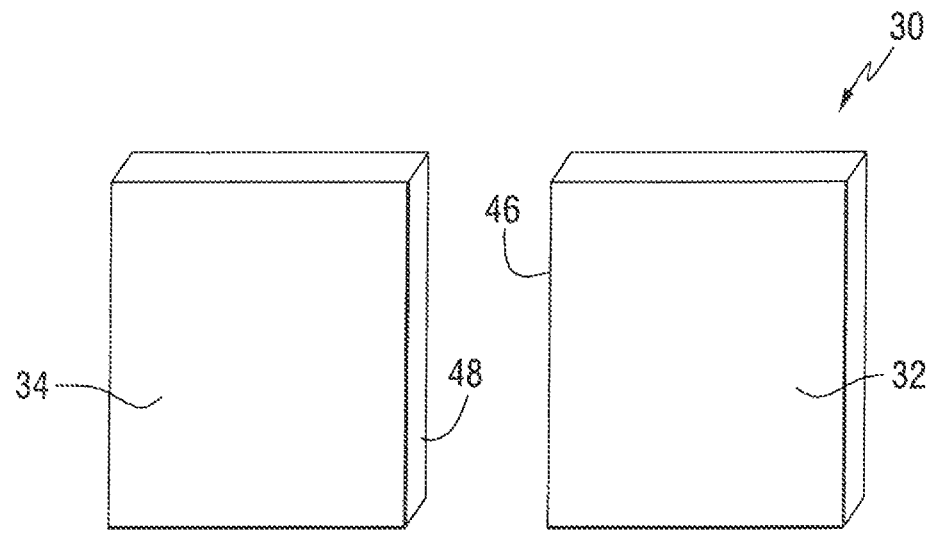
FIG. 7 is a perspective view (not to scale) of an interlayer for a window of the invention divided into multiple pieces.

A method of incorporating a failure strip 28 of the invention into a window will now be described. As shown in FIG. 7, a polymeric material to be utilized as the interlayer is cut into pieces of a desired failure geometry. For example, a polyvinyl butyral (PVB) sheet 30 of desired final dimensions (i.e., length, width, height) to make a window interlayer can be cut into two or more pieces 32, 34 using a conventional knife or other cutting device. The geometry shown in FIG. 7 is for the window shown in FIGS. 1 and 2.

Figure 8:
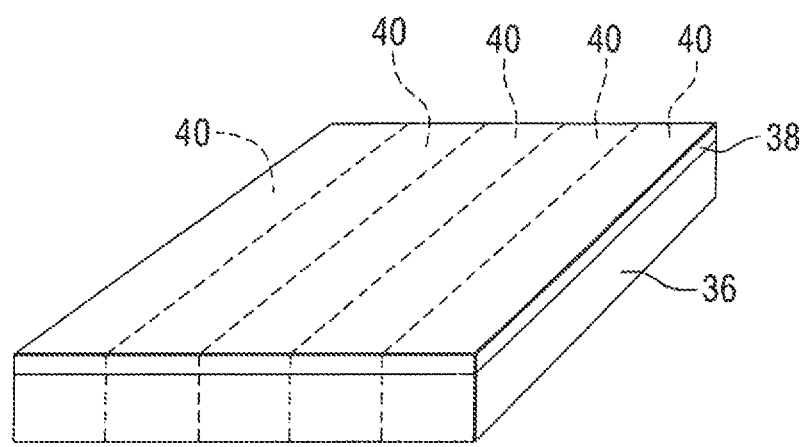
FIG. 8 is a perspective view (not to scale) of a polymeric base coated with a failure orientation material.

As shown in FIG. 8, another sheet 36 of the same material utilized for the interlayer material is used as a base sheet 36. A layer 38 of material to form the failure strip 28 is formed on or attached to the top of the base sheet 36. This attachment can be through, for example, adhesive bonding or chemical adhesion. For example, the base sheet 36 can be polyvinylbutyral (PVB) and the failure strip material layer 38 can be a sheet of PET formed or adhered to the top of the base sheet. This can be done by placing the sheet of PET on the base sheet 36 and then autoclaving or heating the base sheet 36 with the PET layer on it to adhere the PET sheet (failure strip material layer 38) to the base sheet 36. As will be appreciated, the failure strip material is not limited to PET but could be any desired material, such as, but not limited to, polypropylene, or a Mylar® sheet. Alternatively, the failure strip material can be a coating formed over the base sheet 36 in any conventional manner, such as, but not limited to, spray coating, flow coating, etc. Examples of suitable coatings include, but are not limited to, polysiloxane coatings or similar thin films. The failure strip material can be relatively thin. For example, the layer 38 can have a thickness in the range of 0.0004 inch to 0.002 inch (0.001 cm to 0.005 cm), such as 0.0005 inch to 0.0015 inch (0.0013 cm to 0.004 cm). After incorporation of the failure strip material (layer 38) onto the base sheet 36, the coated base sheet 36 is cut into strips 40 or other predetermined geometries having a width substantially the same as the thickness of the interlayer sheet 30. As will be appreciated, since the layer 38 is so thin, it would be difficult to cut or work with the layer 38 alone. The base sheet 36 is thicker than the layer 38. By placing the thin layer 38 on the thicker base sheet 36, the combined structure is much easier to cut and work with.

Figure 9:
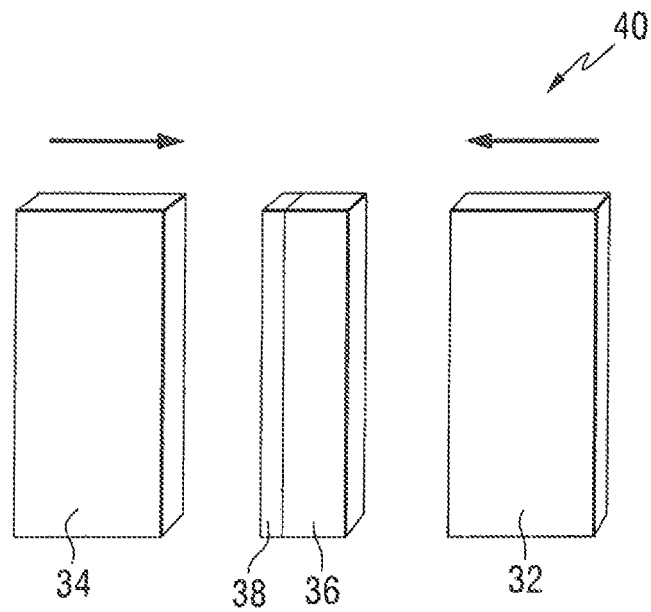
FIG. 9 is a perspective view (not to scale) of the polymeric layer of FIG. 7 incorporating a strip of the failure orientation material of FIG. 8.
Figure 10:
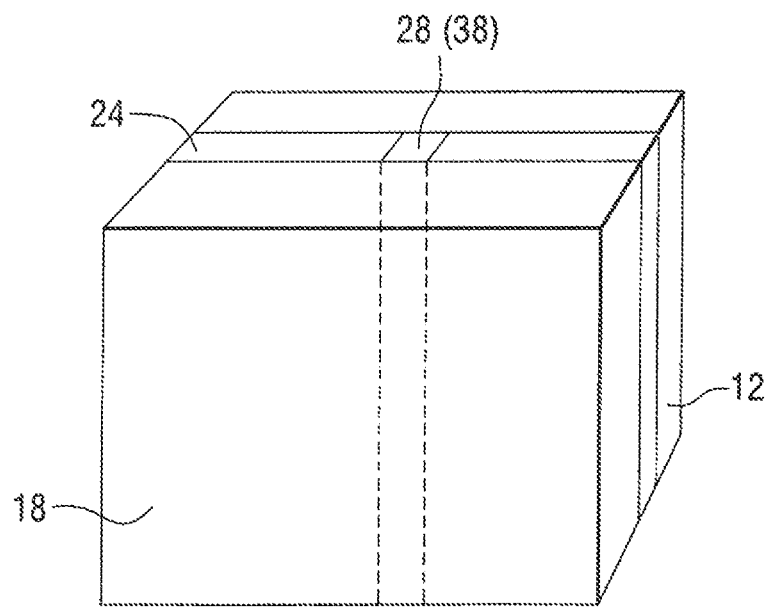
FIG. 10 is a perspective view (not to scale) of a polymeric interlayer for a window of the invention incorporating a failure strip of the invention in a laminated transparency.

As shown in FIG. 9, the strip 40 of the base sheet 36 with the layer 38 of failure material is positioned between the pieces 32, 34 of the interlayer material. The interlayer pieces 32, 34 are moved towards each other as shown by the arrows in FIG. 9 until the pieces 32, 34 contact the strip 40. This structure incorporating the failure strip material from FIG. 9 can be positioned between two glass sheets and heated in conventional manner to fuse or otherwise melt the polymeric material of the interlayer material and the base strip material to form a unitary interlayer as shown in FIG. 10 with the failure strip 28 incorporated into the interlayer 24.

Figure 11:
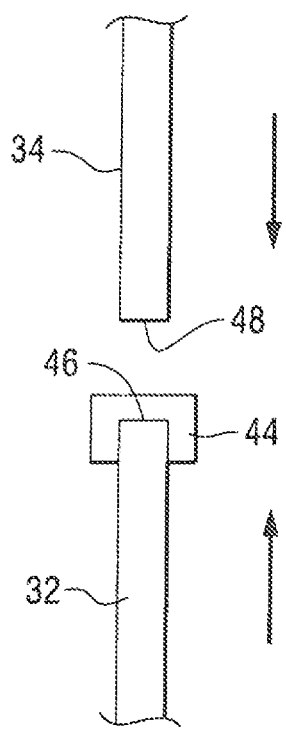
FIG. 11 is a top view (not to scale) of a further method of incorporating a failure strip into a window interlayer.
Figure 12:
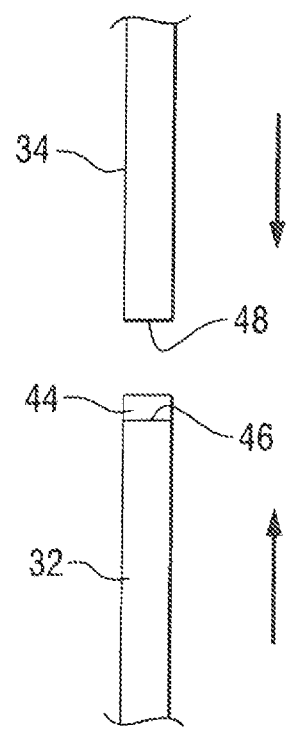
FIG. 12 is a top view (not to scale) of an additional method of incorporating a failure strip into a window interlayer.

Another method of incorporating a failure strip 28 into the window is shown in FIGS. 11 and 12. FIG. 11 is a top view of the pieces 32 and 34 of FIG. 7. In this embodiment, one or more pieces of tape 44 is applied onto or around the inner edge 46 or 48 of one (or both) of the pieces 32, 34. The tape 44 can be a conventional polyethylene tape commercially available from 3M Corporation. The embodiment in FIG. 12 is similar to that of FIG. 11 but the tape is positioned on the edge 46 and does not wrap around the sides of the piece 32.

As shown in FIG. 3, a mesh or fabric framework 52 or strips of metal can be embedded in and/or bonded to the interlayer 24. The framework 52 can be a flexible mesh having an open interior with a perimeter formed by the mesh material. For example, the framework 52 can be placed between two sheets of interlayer material such that an inner edge 54 of the framework 52 extends into or overlaps a portion of the sheets and an outer edge 56 of the framework 52 extends beyond an outer perimeter 58 of the sheets (and hence the plies 12, 18). When the sheets are heated, the inner edge 54 of the framework 52 becomes embedded in the resultant interlayer ply. The failure strip 28 can be incorporated into the same interlayer ply as the framework 52 or a separate ply of interlayer material containing the failure strip(s) 28 can be connected to (e.g., adhered to) the ply containing the framework 52.

As shown in FIGS. 3-6, the window can be incorporated into a frame 60. For example, the outer portion of the framework 52 can be connected to the frame 60, such as but not limited to by screws, bolts, or similar mechanical fasteners. As shown in FIGS. 4 and 6, in the event of an explosion, the window breaks or fails along the lines defined by the failure strips 28. The outer portion of the window remains attached to the frame 60 (for example by the outer portion of the framework 52) such that the pieces of the broken window do not become projectiles but rather remain attached to the frame 60.

The method of the invention provides a method to handle, orient, and incorporate a nearly invisible separator (failure strip) within a laminated window such that, when the laminated window is subjected to deformation by a pressure wave from a blast, the window will fail in a controlled manner rather than an unpredictable failure.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

The invention claimed is:

1. A laminated transparency, comprising:
    a first ply having a No. 1 surface and a No. 2 surface and an outer perimeter;
    a second ply spaced from the first ply and having a No. 3 surface and a No. 4,
    wherein the first and second plies are annealed glass;
    a polymeric interlayer positioned between the first and second plies;
    at least one failure strip incorporated into the interlayer to provide a predetermined failure orientation for the transparency;
    a mesh framework having an open interior with an inner edge of the framework extending into the interlayer and an outer edge of the framework extending beyond the outer perimeters of the plies; and
    a frame, wherein the framework is connected to the frame such that in event of an explosion, the transparency fails along at least one line defined by the at least one failure strip to form a plurality of transparency pieces, with the transparency pieces remaining attached to the frame by the framework.

2. The transparency of claim 1, including a solar control coating over at least a portion of at least one of the plies.

3. The transparency of claim 1, wherein the interlayer comprises polyvinylbutyral.

4. The transparency of claim 1, wherein the failure strip material is selected from the group consisting of a polymeric material, polyethylene tape, Mylar®, PET, polypropylene, polysiloxane, and a mold release agent.

5. A laminated transparency, comprising:
    a first annealed glass ply having a No. 1 surface and a No. 2 surface and an outer perimeter;
    a second annealed glass ply spaced from the first ply and having a No. 3 surface and a No. 4 surface and an outer perimeter, with the No. 2 surface facing the No. 3 surface;
    a polyvinylbutyral interlayer positioned between the first and second plies, wherein the polymeric interlayer does not extend beyond the outer perimeters of the first and second plies;
    at least one failure strip comprising a polymeric material incorporated into the interlayer to provide a predetermined failure orientation for the transparency;
    a mesh framework having an open interior with an inner edge of the framework extending into the interlayer and an outer edge of the framework extending beyond the outer perimeters of the plies; and
    a frame wherein the framework is connected to the frame such that in event of an explosion, the transparency fails along at least one line defined by the at least one failure strip to form a plurality of glass pieces, with the glass pieces remaining attached to the frame by the framework.

6. The transparency of claim 5, wherein the failure strip comprises polypropylene.

7. The transparency of claim 5, wherein the failure strip comprises polyethylene.

* * * * *

UNITED STATES PATENT AND TRADEMARK OFFICE
CERTIFICATE OF CORRECTION

| | | |
|---|---|---|
| PATENT NO. | : 9,550,343 B2 | Page 1 of 1 |
| APPLICATION NO. | : 13/225942 | |
| DATED | : January 24, 2017 | |
| INVENTOR(S) | : John R. Short et al. | |

It is certified that error appears in the above-identified patent and that said Letters Patent is hereby corrected as shown below:

In the Claims

Column 8, Line 6, Claim 1, delete "No. 4," and insert --No. 4 surface and an outer perimeter, with the No. 2 surface facing the No. 3 surface;--

Signed and Sealed this
Eighteenth Day of April, 2017

Michelle K. Lee
*Director of the United States Patent and Trademark Office*